(12) United States Patent
Oltheten et al.

(10) Patent No.: US 11,487,285 B2
(45) Date of Patent: *Nov. 1, 2022

(54) AUTOPILOT RECOUPLING FOR ROTORCRAFT

(71) Applicant: Textron Innovations Inc., Providence, RI (US)

(72) Inventors: Erik John Oltheten, Fort Worth, TX (US); Aaron Thomas Halverson, Grapevine, TX (US); Eric Gordon Emblin, Rosemere (CA)

(73) Assignee: Textron Innovations Inc., Providence, RI (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/065,872

(22) Filed: Oct. 8, 2020

(65) Prior Publication Data
US 2021/0026352 A1  Jan. 28, 2021

Related U.S. Application Data

(63) Continuation of application No. 15/894,876, filed on Feb. 12, 2018, now Pat. No. 10,816,971.

(51) Int. Cl.
*G05D 1/00* (2006.01)
*G05D 1/08* (2006.01)
*B64C 27/04* (2006.01)

(52) U.S. Cl.
CPC .......... *G05D 1/0061* (2013.01); *B64C 27/04* (2013.01); *G05D 1/0858* (2013.01)

(58) Field of Classification Search
CPC ..... G05D 1/0061; G05D 1/0858; B64C 27/04
See application file for complete search history.

(56) References Cited

U.S. PATENT DOCUMENTS 3,801,049 A    4/1974  Chenkovich et al.
3,848,833 A *  11/1974 Rauschelbach ...... G05D 1/0061
                                              318/434

(Continued)

OTHER PUBLICATIONS

BK117 C-2 Training Manual Autopilot; Eurocopter; Dec. 2006.

(Continued)

*Primary Examiner* — Yazan A Soofi
*Assistant Examiner* — Naeem Taslim Alam
(74) *Attorney, Agent, or Firm* — Lawrence Youst PLLC (57) ABSTRACT

An autopilot recoupling system for a rotorcraft having an automatic flight control system with multiple layers of flight augmentation. The autopilot recoupling system includes an autopilot recoupling input operable to generate an autopilot recoupling signal. An autopilot recoupling signal processor is communicably coupled to the autopilot recoupling input. The autopilot recoupling signal processor is configured to receive the autopilot recoupling signal from the autopilot recoupling input and responsive thereto, determine a state of the automatic flight control system, activate a trim systems layer of the automatic flight control system if the trim systems layer is not active, engage an attitude retention systems layer of the automatic flight control system if the attitude retention systems layer is disengage and recouple an autopilot systems layer of the automatic flight control system.

15 Claims, 3 Drawing Sheets

(56) References Cited

U.S. PATENT DOCUMENTS

| | | | | |
|---|---|---|---|---|
| 4,376,979 | A * | 3/1983 | Fowler | B64C 27/54 |
| | | | | 416/143 |
| 4,382,283 | A * | 5/1983 | Clelford | G05D 1/0858 |
| | | | | 244/177 |
| 4,500,967 | A | 2/1985 | Murphy et al. | |
| 4,577,275 | A * | 3/1986 | Adams | G05D 1/0669 |
| | | | | 701/16 |
| 4,603,389 | A * | 7/1986 | Griffith | G05D 1/0669 |
| | | | | 701/7 |
| 5,301,112 | A * | 4/1994 | Gold | G05D 1/0858 |
| | | | | 701/4 |
| 5,714,948 | A * | 2/1998 | Farmakis | G01S 5/0009 |
| | | | | 340/961 |
| 6,460,810 | B2 | 10/2002 | James | |
| 9,132,913 | B1 * | 9/2015 | Shapiro | G08G 5/0086 |
| 2008/0161983 | A1 * | 7/2008 | Salesse-Lavergne | |
| | | | | G05D 1/0669 |
| | | | | 701/8 |
| 2012/0072056 | A1 * | 3/2012 | Hasan | B64C 13/507 |
| | | | | 701/3 |
| 2014/0027565 | A1 * | 1/2014 | Marvin | G05D 1/102 |
| | | | | 244/17.13 |

OTHER PUBLICATIONS

European Exam Report; Application No. 19150119.6; EPO; dated Jun. 7, 2019.
European Search Report; Application No. 19150119.6; EPO; dated May 23, 2019.
Stability Augmentation System and Autopilot; Helisas; Jun. 10, 2016.

* cited by examiner

AUTOPILOT RECOUPLING FOR ROTORCRAFT

CROSS-REFERENCE TO RELATED APPLICATIONS

The present application is a continuation of co-pending application Ser. No. 15/894,876 filed Feb. 12, 2018.

TECHNICAL FIELD OF THE DISCLOSURE

The present disclosure relates, in general, to rotorcraft having automatic flight control systems used during instrument flight rules operations and, in particular, to an autopilot recoupling system for automatically increasing the level of flight augmentation to enable the autopilot systems to stabilize the rotorcraft in an emergency situation.

BACKGROUND

For rotorcraft to be certified to conduct operations in instrument meteorological conditions (IMC) under instrument flight rules (IFR), they must meet certain design and installation requirements, which are in addition to the visual flight rules (VFR) requirements. To meet IFR stability requirements, rotorcraft typically include automatic flight control systems (AFCS) that provide multiple levels or layers of flight augmentation. For example, AFCS may include a first layer such as stability augmentation systems (SAS) that provide short-term attitude and attitude rate stabilization typically used during manual flight, a second layer such as trim systems that provide for a neutral spring position of the cyclic pitch control stick, a third layer such as attitude retention systems (ATT) that maintain the pitch and roll attitude of the rotorcraft in a fixed position against transient short-term disturbances and a fourth layer such as autopilot systems (AP) that provide control over the rotorcraft's flight path, including heading, altitude, vertical speed, navigation tracking, approach and the like. The autopilot systems also provide pitch, roll and yaw axis stabilization relative to the desired attitude and heading reference. The AFCS may also include flight director systems (FD) used to provide lateral and vertical steering commands to maintain the rotorcraft along a desired lateral and vertical flight path. The flight director systems may be used during manual flight or may be coupled to the autopilot systems. It has been found, however, that the complexity of modern automatic flight control systems requires a high degree of understanding by the pilot to safely and efficiently control the rotorcraft during emergency situations when a transition from a manual flight mode to a particular augmented flight mode may be desired.

SUMMARY

In a first aspect, the present disclosure is directed to an autopilot recoupling system for a rotorcraft having an automatic flight control system with multiple layers of flight augmentation. The autopilot recoupling system includes an autopilot recoupling input operable to generate an autopilot recoupling signal. An autopilot recoupling signal processor is communicably coupled to the autopilot recoupling input. The autopilot recoupling signal processor is configured to receive the autopilot recoupling signal from the autopilot recoupling input and responsive thereto, determine a state of the automatic flight control system, activate a trim systems layer of the automatic flight control system if the trim systems layer is not active, engage an attitude retention systems layer of the automatic flight control system if the attitude retention systems layer is disengage and recouple an autopilot systems layer of the automatic flight control system.

In some embodiments, the autopilot recoupling input may be an input on a collective pitch control lever of the rotorcraft such as a go-around input on the collective pitch control lever. In such embodiments, actuation of the go-around input on the collective pitch control lever initiates a go-around maneuver after the autopilot systems layer of the automatic flight control system is recoupled. In certain embodiments, the autopilot recoupling input may be an input on a control panel of the rotorcraft or an input on a display screen of the rotorcraft. In some embodiments, the autopilot recoupling signal is generated responsive to a single actuation of the autopilot recoupling input.

In certain embodiments, the autopilot recoupling signal processor may be configured to delay engagement of the attitude retention systems layer of the automatic flight control system until the trim systems layer of the automatic flight control system is active and/or delay recoupling the autopilot systems layer of the automatic flight control system until the attitude retention systems layer of the automatic flight control system is engaged. In some embodiments, the autopilot recoupling signal processor may sequence the layers of the automatic flight control system by first, activating the trim systems layer of the automatic flight control system if the trim systems layer is not active, second, engaging the attitude retention systems layer of the automatic flight control system if the attitude retention systems layer is disengage and third, recoupling the autopilot systems layer of the automatic flight control system.

In a second aspect, the present disclosure is directed to a method of autopilot recoupling for a rotorcraft having an automatic flight control system with multiple layers of flight augmentation. The method includes generating an autopilot recoupling signal responsive to actuation of an autopilot recoupling input; receiving the autopilot recoupling signal at an autopilot recoupling signal processor and responsive thereto; determining a state of the automatic flight control system; activating a trim systems layer of the automatic flight control system if the trim systems layer is not active; engaging an attitude retention systems layer of the automatic flight control system if the attitude retention systems layer is disengage; and recoupling an autopilot systems layer of the automatic flight control system.

The method may also include generating the autopilot recoupling signal responsive to actuation of an input on a collective pitch control lever of the rotorcraft; generating the autopilot recoupling signal responsive to actuation of a go-around input on the collective pitch control lever; initiating a go-around maneuver after actuation of the go-around input on the collective pitch control lever and recoupling the autopilot systems layer of the automatic flight control system; generating the autopilot recoupling signal responsive to actuation of an input on a control panel of the rotorcraft; generating the autopilot recoupling signal responsive to actuation of an input on a display screen of the rotorcraft; delaying engagement of the attitude retention systems layer of the automatic flight control system until the trim systems layer of the automatic flight control system is active; delaying recoupling the autopilot systems layer of the automatic flight control system until the attitude retention systems layer of the automatic flight control system is engaged and/or sequencing the layers of the automatic flight control system by first, activating the trim systems layer of the automatic flight control system if the trim systems layer is not active; second, engaging the attitude retention systems layer of the automatic flight control system if the attitude retention systems layer is disengage; and third, recoupling the autopilot systems layer of the automatic flight control system.

In a third aspect, the present disclosure is directed to a rotorcraft including an automatic flight control system with multiple layers of flight augmentation and an autopilot recoupling input operable to generate an autopilot recoupling signal. An autopilot recoupling signal processor is communicably coupled to the autopilot recoupling input. The autopilot recoupling signal processor is configured to receive the autopilot recoupling signal from the autopilot recoupling input and responsive thereto, determine a state of the automatic flight control system, activate a trim systems layer of the automatic flight control system if the trim systems layer is not active, engage an attitude retention systems layer of the automatic flight control system if the attitude retention systems layer is disengage and recouple an autopilot systems layer of the automatic flight control system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and nonmoving mechanical connections.

Figure 1A:
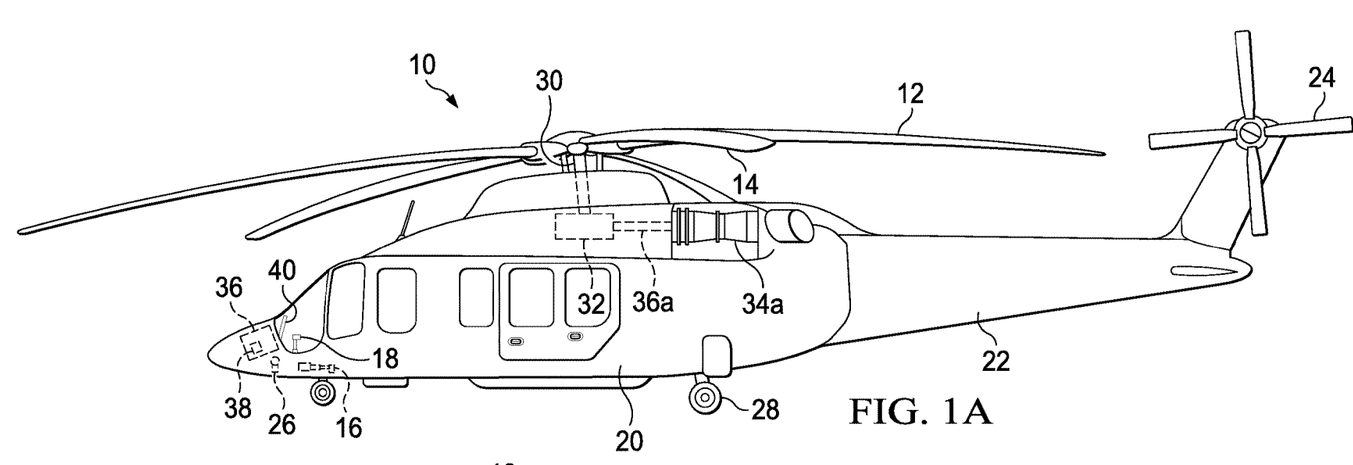
FIGS. 1A-1B are schematic illustrations of an exemplary rotorcraft having an autopilot recoupling system in accordance with embodiments of the present disclosure.
Figure 1B:
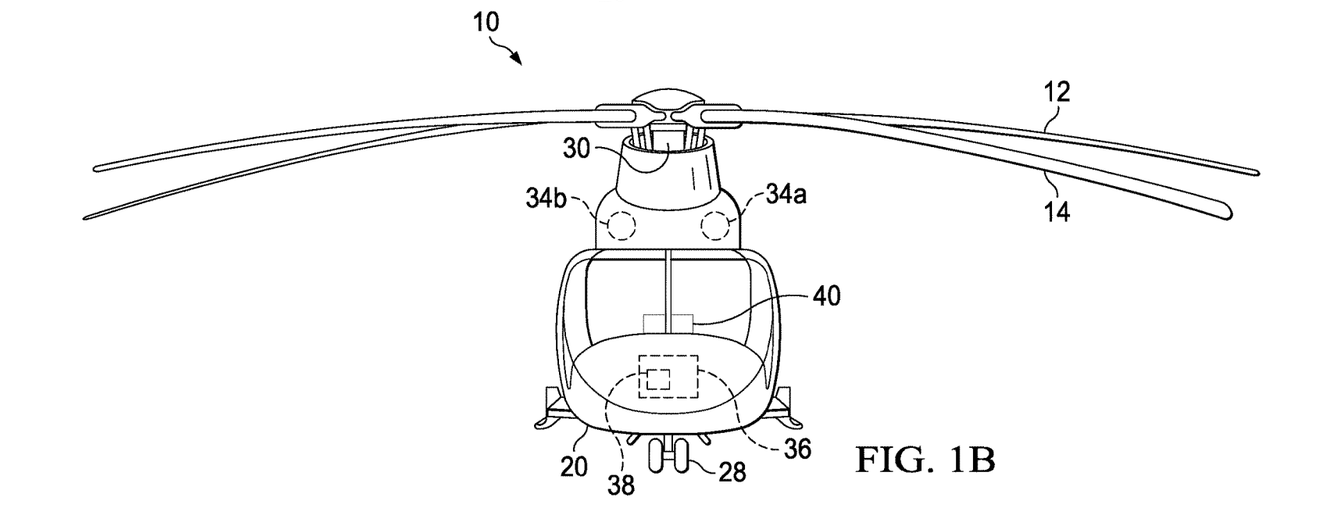

Referring now to FIGS. 1A-1B in the drawings, a rotorcraft depicted as helicopter 10 is schematically illustrated. Helicopter 10 has a main rotor 12 with a plurality of rotor blades 14. The pitch of rotor blades 14 can be collectively manipulated using collective pitch control lever 16 and cyclically manipulated using cyclic pitch control stick 18 to selectively control direction, thrust and lift of helicopter 10. Helicopter 10 includes a body depicted as fuselage 20 and tailboom 22. Helicopter 10 also includes an anti-torque system depicted as tail rotor 24 that is controlled by anti-torque pedals 26. Helicopter 10 has a landing gear system 28 to provide ground support for the aircraft. Main rotor 12 is supported atop helicopter 10 by a mast 30, which connects main rotor 12 to a main gearbox 32. Main gearbox 32 includes a plurality of gears that are mechanically coupled to a pair of engines 34a, 34b that provide torque and rotational energy to main gearbox 32 via respective driveshafts, only driveshaft 36a being visible in the figure. In the illustrated embodiment, engines 34a, 34b are depicted as power turbine engines. Main gearbox 32 includes a transmission that is used to adjust the engine output to a suitable rotational speed so that engines 34a, 34b and main rotor 12 may rotate at optimum speeds during flight.

Helicopter 10 has a flight control computer 36 that includes automatic flight control systems (AFCS) having multiple pilot selectable levels or layers of flight augmentation. In the illustrated embodiment, AFCS included four systems layers; namely, a stability augmentation system (SAS), a trim system, an attitude retention system (ATT) and an autopilot system (AP). AFCS also includes a flight director system (FD) that may be used in during manual flight or may be coupled to the autopilot system. In the illustrated embodiment, helicopter 10 includes an autopilot recoupling signal processor 38 that may be independent of or a part of flight control computer 36. Autopilot recoupling signal processor 38 is designed to execute instructions in order to perform the operations and functionality described herein including determining the states of other systems and generating commands to automatically change the states of other systems.

Helicopter 10 includes an instrument panel 40 having a plurality of analog gauges and/or digital displays that provide the pilot with information about the flight situation of helicopter 10. For example, instrument panel 40 may include an altimeter, an airspeed indicator, a vertical speed indicator, a directional gyro, a dual tachometer, a magnetic compass, an attitude indicator, a heading indicator and the like. Instrument panel 40 also includes inputs such as buttons, dials and hard switches as well as soft switches in embodiments of helicopter 10 having touch screen displays. In the illustrated embodiment, helicopter 10 includes an autopilot recoupling input in the form of a button, a hard switch or a soft switch on instrument panel 40. Alternatively or additionally, the autopilot recoupling input of helicopter 10 may be an input on collective pitch control lever 16 such as the go-around input on collective pitch control lever 16.

It should be understood by those having ordinary skill in the art that the go-around input on the collective pitch control lever in a conventional rotorcraft has functionality only when the trim system is in an activated state, the attitude retention system is in an engaged state and the autopilot system is in a coupled state. More specifically, execution of a go-around maneuver responsive to actuation of the go-around input is only possible when the rotorcraft is flying in a fully augmented state. If any one of these systems is not in the required state, actuation of the go-around input yields no results. If each of these systems is in the required state, however, actuation of the go-around input causes the rotorcraft to discontinue the landing approach including leveling the rotorcraft in pitch and roll, selecting a best climb speed and climb angle and performing the selected climbout to provide suitable altitude for safety. Thus, the go-around input on conventional rotorcraft is only useful during instrument approaches but has no function during manual flight operations.

In addition, it should be understood by those having ordinary skill in the art that in a convectional rotorcraft that has an automatic flight control system with multiple layers of flight augmentation, when a pilot is operating the rotorcraft in a manual flight mode there are numerous steps that must be taken by the pilot to increase the level of flight augmentation to a fully augmented or coupled (CPL) state wherein the trim system is in an activated state, the attitude retention system is in an engaged state, the stability augmentation system is in a disengaged state and the autopilot system is in a coupled state with the flight director system. For example, it is common practice for a pilot to fly a rotorcraft manually with only the stability augmentation system engaged. In this manual flight mode of the rotorcraft, the trim system is in a deactivated state, the attitude retention system is in a disengaged state and the autopilot system is in a decoupled state. In the event of an emergency situation, such as the pilot becoming disoriented upon entering instrument meteorological conditions, it may be desirable to transition from the manual flight mode to the fully augmented flight mode or coupled state. In convention rotorcraft, this process requires a high degree of understanding and coordination by the pilot to safely and efficiently control the rotorcraft. Specifically, to transition from the manual flight mode to the coupled state, the pilot must perform several actions in the proper sequence and with proper timing delays. First, the pilot must activate the trim systems layer of the automatic flight control system using the trim systems input that may be located on cyclic pitch control stick 18. Once the trim systems layer is active, the pilot must engage the attitude retention systems layer and disengage the stability augmentation system layer of the automatic flight control system using one or more inputs that may be located on instrument panel 40. Once the attitude retention systems layer is engaged and active, the pilot must recouple the autopilot systems layer to the desired mode using one or more inputs that may be located on instrument panel 40. If the pilot is in a disoriented condition, however, performing these multiple actions in the proper sequence with the proper timing delays while still safely controlling the rotorcraft may be difficult.

Figure 2:
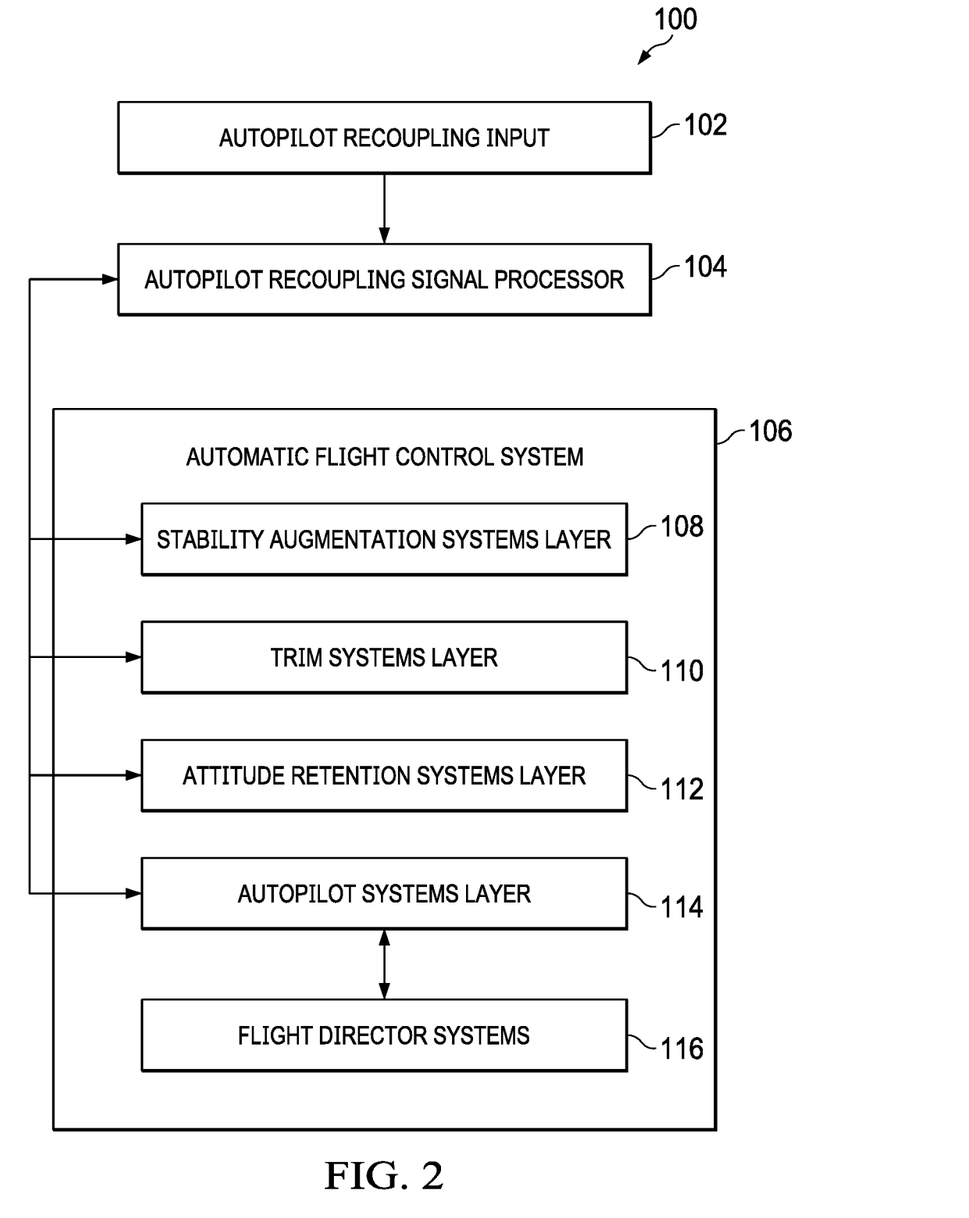
FIG. 2 is a systems diagram of an autopilot recoupling system for a rotorcraft in accordance with embodiments of the present disclosure.

Referring now to FIG. 2, therein is depicted a systems diagram of an autopilot recoupling system for a rotorcraft that is generally designated 100. In the illustrated embodiment, autopilot recoupling system 100 includes an autopilot recoupling input 102 that is operable to generate an autopilot recoupling signal responsive to a single actuation of autopilot recoupling input 102 by the pilot. As discussed herein, autopilot recoupling input 102 may be located on instrument panel 40 in the form of a button, hard switch, soft switch or other suitable input means. Preferably, however, autopilot recoupling input 102 is located on collective pitch control lever 16 such that the pilot does not have to release collective pitch control lever 16 to actuate autopilot recoupling input 102. Most preferably, autopilot recoupling input 102 is an existing control on collective pitch control lever 16 known as the go-around input. In the disclosed embodiments, autopilot recoupling input 102 is specifically used during manual flight mode to automatically increase the level of augmentation to the coupled state.

Autopilot recoupling system 100 also includes an autopilot recoupling signal processor 104 that may be independent of or a part of the flight control computer of the rotorcraft. Autopilot recoupling signal processor 104 is designed to execute instructions in order to receive the autopilot recoupling signal generated by autopilot recoupling input 102 and, responsive thereto, determine the states of other systems and generate commands to automatically change the states of other systems as required. In embodiments of the present disclosure, autopilot recoupling signal processor 104 may be a general purpose processor, a processor core, a multiprocessor, a reconfigurable processor, a microcontroller, a digital signal processor (DSP), an application specific integrated circuit (ASIC), a controller, a state machine, gated logic, discrete hardware components, any other processing unit, or any combination or multiplicity thereof. The operations of autopilot recoupling signal processor 104 may take place in a single processing unit, multiple processing units, a single processing core, multiple processing cores, special purpose processing cores, co-processors or any combination thereof. According to certain embodiments, autopilot recoupling signal processor 104 may be a software based or hardware based virtualized computing machine executing within one or more other computing machines such as the flight control computer of the rotorcraft.

Autopilot recoupling system 100 further includes an automatic flight control system 106 that has multiple layers of flight augmentation. In the illustrated embodiment, automatic flight control system 106 include a stability augmentation systems (SAS) layer 108 that provides short-term attitude and attitude rate stabilization typically used during manual flight, a trim systems layer 110 that provides for a neutral spring position of the cyclic pitch control stick, an attitude retention systems (ATT) layer 112 that maintains the pitch and roll attitude of the rotorcraft in a fixed position against transient short-term disturbances and an autopilot systems (AP) layer 114 that provide control over the rotorcraft's flight path, including heading, altitude, vertical speed, navigation tracking, approach and the like. In addition, autopilot systems layer 114 provides pitch, roll and yaw axis stabilization relative to the desired attitude and heading reference. In a fully augmented flight mode, autopilot systems layer 114 is coupled flight director systems (FD) 116 that provide lateral and vertical steering commands to maintain the rotorcraft along a desired lateral and vertical flight path.

In the illustrated embodiment, autopilot recoupling signal processor 104 is in communication with stability augmentation systems layer 108, trim systems layer 110, attitude retention systems layer 112 and autopilot systems layer 114. In this manner, when autopilot recoupling signal processor 104 receives the autopilot recoupling signal generated by autopilot recoupling input 102, autopilot recoupling signal processor 104 is operable to determine the state of each of stability augmentation systems layer 108, trim systems layer 110, attitude retention systems layer 112 and autopilot systems layer 114. Thereafter, autopilot recoupling signal processor 104 is operable send signals to each of stability augmentation systems layer 108, trim systems layer 110, attitude retention systems layer 112 and autopilot systems layer 114, as required, to achieve the desired recoupling of autopilot systems layer 114 thereby automatically increasing the level of augmentation from the manual flight mode to the coupled flight mode.

Figure 3:
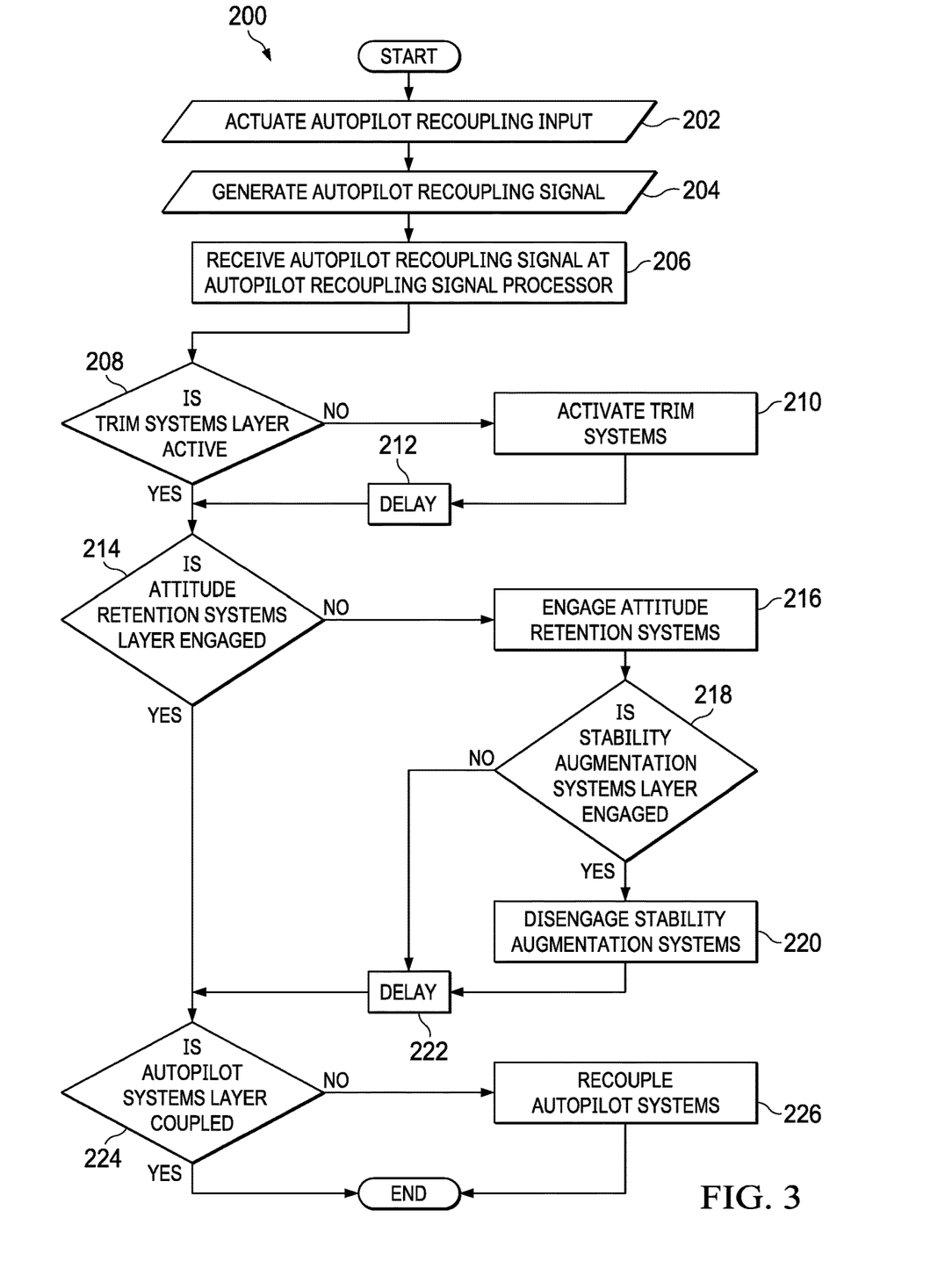
FIG. 3 is a logic diagram of an autopilot recoupling algorithm for a rotorcraft in accordance with embodiments of the present disclosure.

Referring additionally to FIG. 3, an algorithm for autopilot recoupling will now be discussed with reference to a logic diagram that is generally designated 200. The process starts with the pilot of the rotorcraft actuating the autopilot recoupling input at operation 202. This results in the generation of the autopilot recoupling signal at operation 204. The autopilot recoupling signal is received by the autopilot recoupling signal processor in block 206. The autopilot recoupling signal processor then determines the state of the trim systems layer in decision 208. If the trim systems layer is not active, the autopilot recoupling signal processor sends commands to activate the trim systems layer in block 210. While the trim systems layer is activating, the autopilot recoupling signal processor waits at delay block 212. Once the trim systems layer is activating or if it was determined at decision 208 that the trim systems layer was already activated, the autopilot recoupling signal processor determines the state of the attitude retention systems layer in decision 214. If the attitude retention systems layer is not engaged, the autopilot recoupling signal processor sends commands to engage the attitude retention systems layer in block 216. The autopilot recoupling signal processor now determines the state of the stability augmentation systems layer in decision 218. If the stability augmentation systems layer is engaged, the autopilot recoupling signal processor sends commands to disengage the stability augmentation systems layer in block 220. While the attitude retention systems layer is engaging and the stability augmentation systems layer is disengaging, the autopilot recoupling signal processor waits at delay block 222. Once the attitude retention systems layer is engaged and the stability augmentation systems layer is disengaged or if it was determined at decision 214 that the attitude retention systems layer was already engaged, the autopilot recoupling signal processor determines the state of the autopilot system layer in decision 224. If the autopilot system layer is not coupled, the autopilot recoupling signal processor sends commands to recouple the autopilot system layer in block 226.

In this manner, a single actuation of the autopilot recoupling input by the pilot during an emergency situation while operating in a manual flight mode results in execution of the multiple actions, in the proper sequence and with the proper timing delays, by the autopilot recoupling signal processor that are required to increase the level of flight augmentation to the desired coupled state. This automatic emergency recoupling of the autopilot systems layer alleviates the requirement for the pilot to perform these multiple actions with the proper sequencing and timing delays, which could be difficult for the pilot to perform in certain situations. Accordingly, the autopilot recoupling system of the present disclosure provides important safety enhancements for rotorcraft operations.

Embodiments of autopilot recoupling system disclosed herein may comprise a computer program that embodies the functions described and illustrated herein, wherein the computer program is implemented in a computer system, such as the autopilot recoupling signal processor disclosed herein that comprises instructions stored in a machine-readable medium and a processor that executes the instructions. However, it should be apparent that there could be many different ways of implementing embodiments in computer programming and the embodiments should not be construed as limited to any one set of computer program instructions. Further, a skilled programmer would be able to write such a computer program to implement the disclosed embodiments based on the appended flow charts, algorithms and associated description herein. Therefore, disclosure of a particular set of program code instructions is not considered necessary for an adequate understanding of how to make and use the disclosed embodiments. Further, those skilled in the art will appreciate that one or more aspects of the embodiments described herein may be performed by hardware, software or a combination thereof. Moreover, any reference to an act being performed by a computer should not be construed as being performed by a single computer as more than one computer may perform the act.

The example embodiments described herein may be used with computer hardware and software that perform the methods and processing functions described previously. The systems, methods and procedures described herein may be embodied in a programmable computer, computer-executable software or digital circuitry. The software may be stored on computer-readable media such as one or more of a floppy disk, RAM, ROM, hard disk, removable media, flash memory, memory stick, optical media, magneto-optical media, CD-ROM and the like. Digital circuitry may include integrated circuits, gate arrays, building block logic, field programmable gate arrays (FPGA) and the like. The example systems, methods and acts described in the embodiments presented previously are illustrative and, in alternative embodiments, certain acts can be performed in a different order, in parallel with one another, omitted entirely and/or combined between different example embodiments and/or certain additional acts can be performed, without departing from the scope and spirit of embodiments disclosed herein. Accordingly, such alternative embodiments are included in the description herein.

As used herein, the term "hardware" may include a combination of discrete components, an integrated circuit, an application-specific integrated circuit, a field programmable gate array or other suitable hardware. As used herein, the term "software" may include one or more objects, agents, threads, lines of code, subroutines, separate software applications, two or more lines of code or other suitable software structures operating in one or more software applications, on one or more processors, wherein a processor may include one or more microcomputers or other suitable data processing units, memory devices, input-output devices, displays, data input devices, peripherals, associated drivers, control cards, power sources, network devices or other suitable devices operating under control of software systems in conjunction with the processor or other devices.

In general, a software system is a system that operates on a processor to perform predetermined functions in response to predetermined data fields. Unless a specific algorithm is disclosed, then any suitable algorithm that would be known to one of skill in the art for performing the function using the associated data fields is contemplated as falling within the scope of the disclosure. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An autopilot recoupling system for a rotorcraft having an automatic flight control system with multiple layers of flight augmentation, a manual flight mode and a coupled flight mode, the autopilot recoupling system comprising:
   a go-around input on a collective pitch control lever that initiates a go-around maneuver to discontinue a landing approach when actuated in the coupled flight mode and that generates an autopilot recoupling signal responsive to a single actuation in the manual flight mode;
   an autopilot recoupling signal processor communicably coupled to the go-around input, the autopilot recoupling signal processor configured to:
   receive the autopilot recoupling signal from the go-around input and responsive thereto;
   determine a state of the automatic flight control system;
   activate a trim systems layer of the automatic flight control system if the trim systems layer is not active, the trim systems layer for cyclic pitch control;
   engage an attitude retention systems layer of the automatic flight control system if the attitude retention systems layer is disengaged; and
   recouple an autopilot systems layer of the automatic flight control system, thereby automatically increasing the level of augmentation from the manual flight mode to the coupled flight mode;
   wherein the autopilot recoupling signal processor is further configured to delay engagement of the attitude retention systems layer of the automatic flight control system until the trim systems layer of the automatic flight control system is active.

2. The autopilot recoupling system as recited in claim 1 wherein the autopilot recoupling signal processor is further configured to delay recoupling the autopilot systems layer of the automatic flight control system until the attitude retention systems layer of the automatic flight control system is engaged.

3. The autopilot recoupling system as recited in claim 1 wherein the autopilot recoupling signal processor is further configured to sequence the layers of the automatic flight control system by engaging the attitude retention systems layer of the automatic flight control system prior to recoupling the autopilot systems layer of the automatic flight control system.

4. A method of autopilot recoupling for a rotorcraft having an automatic flight control system with multiple layers of flight augmentation, a manual flight mode and a coupled flight mode, the rotorcraft including a collective pitch control lever having a go-around input that initiates a go-around maneuver to discontinue a landing approach when actuated in the coupled flight mode, the method comprising:
   generating an autopilot recoupling signal responsive to a single actuation of the go-around input in the manual flight mode;
   receiving the autopilot recoupling signal at an autopilot recoupling signal processor and responsive thereto;
   determining a state of the automatic flight control system;
   activating a trim systems layer of the automatic flight control system if the trim systems layer is not active, the trim systems layer for cyclic pitch control;
   engaging an attitude retention systems layer of the automatic flight control system if the attitude retention systems layer is disengaged;
   recoupling an autopilot systems layer of the automatic flight control system, thereby automatically increasing the level of augmentation from the manual flight mode to the coupled flight mode; and
   delaying engagement of the attitude retention systems layer of the automatic flight control system until the trim systems layer of the automatic flight control system is active.

5. The method as recited in claim 4 further comprising delaying recoupling the autopilot systems layer of the automatic flight control system until the attitude retention systems layer of the automatic flight control system is engaged.

6. The method as recited in claim 4 further comprising sequencing the layers of the automatic flight control system by engaging the attitude retention systems layer of the automatic flight control system prior to recoupling the autopilot systems layer of the automatic flight control system.

7. A rotorcraft having a manual flight mode and a coupled flight mode, the rotorcraft comprising:
   an automatic flight control system with multiple layers of flight augmentation;
   a collective pitch control lever having a go-around input that initiates a go-around maneuver to discontinue a landing approach when actuated in the coupled flight mode and that generates an autopilot recoupling signal responsive to a single actuation in the manual flight mode;
   an autopilot recoupling signal processor communicably coupled to the go-around input, the autopilot recoupling signal processor configured to:
   receive the autopilot recoupling signal from the go-around input and responsive thereto;
   determine a state of the automatic flight control system;
   activate a trim systems layer of the automatic flight control system if the trim systems layer is not active, the trim systems layer for cyclic pitch control;
   engage an attitude retention systems layer of the automatic flight control system if the attitude retention systems layer is disengaged; and
   recouple an autopilot systems layer of the automatic flight control system, thereby automatically increasing the level of augmentation from the manual flight mode to the coupled flight mode;

wherein the autopilot recoupling signal processor is further configured to delay engagement of the attitude retention systems layer of the automatic flight control system until the trim systems layer of the automatic flight control system is active.

8. The rotorcraft as recited in claim 7 wherein the autopilot recoupling signal processor is further configured to delay recoupling the autopilot systems layer of the automatic flight control system until the attitude retention systems layer of the automatic flight control system is engaged.

9. The rotorcraft as recited in claim 7 wherein the autopilot recoupling signal processor is further configured to sequence the layers of the automatic flight control system by engaging the attitude retention systems layer of the automatic flight control system prior to recoupling the autopilot systems layer of the automatic flight control system.

10. An autopilot recoupling system for a rotorcraft having an automatic flight control system with multiple layers of flight augmentation, a manual flight mode and a coupled flight mode, the autopilot recoupling system comprising:
 a go-around input on a collective pitch control lever that initiates a go-around maneuver to discontinue a landing approach when actuated in the coupled flight mode and that generates an autopilot recoupling signal responsive to a single actuation in the manual flight mode;
 an autopilot recoupling signal processor communicably coupled to the go-around input, the autopilot recoupling signal processor configured to:
  receive the autopilot recoupling signal from the go-around input and responsive thereto;
  determine a state of the automatic flight control system;
  activate a trim systems layer of the automatic flight control system if the trim systems layer is not active, the trim systems layer for cyclic pitch control;
  engage an attitude retention systems layer of the automatic flight control system if the attitude retention systems layer is disengaged; and
  recouple an autopilot systems layer of the automatic flight control system, thereby automatically increasing the level of augmentation from the manual flight mode to the coupled flight mode;
  wherein the autopilot recoupling signal processor is further configured to delay recoupling the autopilot systems layer of the automatic flight control system until the attitude retention systems layer of the automatic flight control system is engaged.

11. The autopilot recoupling system as recited in claim 10 wherein the autopilot recoupling signal processor is further configured to sequence the layers of the automatic flight control system by activating the trim systems layer of the automatic flight control system prior to engaging the attitude retention systems layer of the automatic flight control system.

12. A method of autopilot recoupling for a rotorcraft having an automatic flight control system with multiple layers of flight augmentation, a manual flight mode and a coupled flight mode, the rotorcraft including a collective pitch control lever having a go-around input that initiates a go-around maneuver to discontinue a landing approach when actuated in the coupled flight mode, the method comprising:

generating an autopilot recoupling signal responsive to a single actuation of the go-around input in the manual flight mode;
 receiving the autopilot recoupling signal at an autopilot recoupling signal processor and responsive thereto;
 determining a state of the automatic flight control system;
 activating a trim systems layer of the automatic flight control system if the trim systems layer is not active, the trim systems layer for cyclic pitch control;
 engaging an attitude retention systems layer of the automatic flight control system if the attitude retention systems layer is disengaged;
 recoupling an autopilot systems layer of the automatic flight control system, thereby automatically increasing the level of augmentation from the manual flight mode to the coupled flight mode; and
 delaying recoupling the autopilot systems layer of the automatic flight control system until the attitude retention systems layer of the automatic flight control system is engaged.

13. The method as recited in claim 12 further comprising sequencing the layers of the automatic flight control system by activating the trim systems layer of the automatic flight control system prior to engaging the attitude retention systems layer of the automatic flight control system.

14. A rotorcraft having a manual flight mode and a coupled flight mode, the rotorcraft comprising:
 an automatic flight control system with multiple layers of flight augmentation;
 a collective pitch control lever having a go-around input that initiates a go-around maneuver to discontinue a landing approach when actuated in the coupled flight mode and that generates an autopilot recoupling signal responsive to a single actuation in the manual flight mode;
 an autopilot recoupling signal processor communicably coupled to the go-around input, the autopilot recoupling signal processor configured to:
  receive the autopilot recoupling signal from the go-around input and responsive thereto;
  determine a state of the automatic flight control system;
  activate a trim systems layer of the automatic flight control system if the trim systems layer is not active, the trim systems layer for cyclic pitch control;
  engage an attitude retention systems layer of the automatic flight control system if the attitude retention systems layer is disengaged; and
  recouple an autopilot systems layer of the automatic flight control system, thereby automatically increasing the level of augmentation from the manual flight mode to the coupled flight mode;
  wherein the autopilot recoupling signal processor is further configured to delay recoupling the autopilot systems layer of the automatic flight control system until the attitude retention systems layer of the automatic flight control system is engaged.

15. The rotorcraft as recited in claim 14 wherein the autopilot recoupling signal processor is further configured to sequence the layers of the automatic flight control system by activating the trim systems layer of the automatic flight control system prior to engaging the attitude retention systems layer of the automatic flight control system.

* * * * *